United States Patent
Belay

(10) Patent No.: US 8,464,259 B2
(45) Date of Patent: *Jun. 11, 2013

(54) MIGRATING VIRTUAL MACHINES CONFIGURED WITH DIRECT ACCESS DEVICE DRIVERS

(75) Inventor: Adam M. Belay, Cambridge, MA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/397,822

(22) Filed: Feb. 16, 2012

(65) Prior Publication Data

US 2012/0151483 A1 Jun. 14, 2012

Related U.S. Application Data

(63) Continuation of application No. 12/410,695, filed on Mar. 25, 2009, now Pat. No. 8,146,082.

(51) Int. Cl.
*G06F 9/455* (2006.01)

(52) U.S. Cl.
USPC .......................... 718/1; 711/6; 711/E12.001

(58) Field of Classification Search
None
See application file for complete search history.

(56) References Cited

U.S. PATENT DOCUMENTS

| | | | | |
|---|---|---|---|---|
| 5,971,851 A * | 10/1999 | Pascal et al. | ......... | 714/E11.137 |
| 6,640,278 B1 * | 10/2003 | Nolan et al. | ...... | 711/6 |
| 7,865,893 B1 | 1/2011 | Omelyanchuk et al. | | |
| 7,925,850 B1 | 4/2011 | Waldspurger et al. | | |
| 8,078,764 B2 * | 12/2011 | Okitsu et al. | ................... | 710/200 |
| 2002/0031230 A1 * | 3/2002 | Sweet et al. | ................... | 380/278 |
| 2005/0055399 A1 * | 3/2005 | Savchuk | ........................ | 709/203 |
| 2005/0081108 A1 * | 4/2005 | Shabalin | ........................ | 714/38 |
| 2007/0294496 A1 | 12/2007 | Goss et al. | | |
| 2009/0006710 A1 * | 1/2009 | Daniel et al. | ................... | 710/315 |
| 2009/0198862 A1 | 8/2009 | Okitsu et al. | | |
| 2009/0307538 A1 * | 12/2009 | Hernandez et al. | ............. | 714/54 |
| 2010/0250824 A1 | 9/2010 | Belay et al. | | |
| 2010/0281195 A1 * | 11/2010 | Daniel et al. | ................... | 710/105 |

OTHER PUBLICATIONS

Budruk, Ravi, et al. PCI Express System Architecture. MindShare, Inc., Addison-Wesley, Jul. 2004, p. 382.*
Edwin Zhai et al., "Live Migration with Pass-through Device for Linux VM." Proceedings of the Linux Symposium, Jul. 23-26, 2008, Ottawa, Ontario, Canada, 10 pages.

* cited by examiner

*Primary Examiner* — Reginal Bragdon
*Assistant Examiner* — Daniel Bernard

(57) ABSTRACT

In one or more embodiments of the invention, migration of a virtual machine includes identifying a hardware resource which is accessed directly by a device driver of the virtual machine and generating an emulation of the hardware resource to simulate the hardware resource as experiencing an error. The current state of the virtual machine can then be transmitted to the destination host computer, wherein the current state includes the emulation which simulates the hardware resource as experiencing an error. In at least one embodiment, generating the emulation includes defining the error as one that triggers a reset of the hardware resource after migration of the virtual machine from the source host computer to the destination host computer.

14 Claims, 4 Drawing Sheets

MIGRATING VIRTUAL MACHINES CONFIGURED WITH DIRECT ACCESS DEVICE DRIVERS

CROSS REFERENCE TO RELATED APPLICATIONS

This application is a continuation of the U.S. patent application Ser. No. 12/410,695 filed on Mar. 25, 2009, entitled "Migrating Virtual Machines Configured with Pass-Through Devices," which issued on Mar. 27, 2012 as U.S. Pat. No. 8,146,082.

BACKGROUND ART

An important feature of virtualized systems is an ability to "migrate" a virtual machine (VM) running on one host computer to another host computer. The migration may be needed, for example, for load balancing. Prior to migration, the current state of the VM on a source host computer is captured and a "snapshot" of the VM is created. The snapshot includes the then-current state of the VM's CPU, RAM and peripheral devices (e.g., network adapter, storage drives, etc.). The snapshot is then migrated or transferred to a destination host computer, and is used to instantiate a new VM which is able to resume operations without loss of data or state. Capturing the current state of the VM is possible because the VM's hardware (i.e., CPU, RAM, peripheral devices, etc.) are emulated in software, and therefore, data that characterize the state of the VM can be readily extracted from the RAM of the source host computer.

As a way to improve I/O performance of emulated devices, manufacturers of I/O devices, such as storage and network devices, have begun to incorporate virtualization support directly into the device. For example, an I/O device that complies with the Single Root I/O Virtualization (SR-IOV) specification enables multiple VMs on a single host computer to share resources of the device. Specifically, virtualization software, for example, a hypervisor, of a virtualized host computer can instruct device drivers of an SR-IOV compliant peripheral device to partition and allocate the device's physical resources (e.g., registers, RAM, etc.) to support simultaneously multiple VMs running on the host computer.

When the host computer includes a Memory Management Unit (MMU) as part of its hardware architecture, the virtualization software, for example, the hypervisor, is able to provide device drivers of a VM's guest operating system (OS) mappings between the VM's virtual addresses used by the device drivers of the guest OS to transmit instructions to devices through memory mapped I/O techniques and machine addresses of the host computer that have been mapped to I/O control registers within the corresponding physical devices. These MMU mappings enable the device drivers of a guest OS to transmit device instructions directly to their corresponding physical devices by writing such instructions into addresses of the VM's own virtual address space that have been allocated to the physical device through memory mapped I/O. When the host computer additionally includes an I/O Memory Management Unit (IOMMU) as part of its hardware architecture, the virtualization software is further able to provide physical devices mappings of a VM's physical addresses, as understood by the VM's guest operating system (OS), to their corresponding machine addresses. These mappings enable, for example, an SR-IOV compliant device that has directly received an instruction from a device driver of a guest OS (e.g., via memory mapped I/O and mappings in the MMU) that includes references to the VM's physical addresses as understood by the guest OS to read and write directly from and to the VM's address space, in accordance with the received instruction, thereby obviating a need for an emulated device that assists with such physical-to-machine address translations. Physical devices that are exposed directly to the guest OS through a MMU and can directly access the VM's address space in the host computer system machine memory through an IOMMU in the manner described above are known as pass-through devices.

While these hardware enhancements in devices and memory management increase performance capabilities during the operation of virtualized systems, they nevertheless, complicate migration tasks. Because device state (e.g., configuration information negotiated with a device driver, etc.) is stored in the hardware device itself rather than in an emulated device, device state cannot be readily captured at a source host computer and transferred to a destination host computer during VM migration. To address this issue, current migration methods unmap or otherwise remove pass-through devices from the VM, resulting in "tear-down" and unloading of corresponding device drivers from the guest OS. When the VM is migrated to a destination host computer, pass-through devices at the destination host computer are mapped into the VM, and corresponding device drivers are reloaded into the guest OS. The process of tearing down a device driver at a source host computer and reloading it at a destination host computer can consume a lot of time, resulting in longer periods of service interruption during VM migration.

SUMMARY OF THE INVENTION

In one or more embodiments of the invention, migration of a virtual machine includes identifying a hardware resource which is accessed directly by a device driver of the virtual machine and generating an emulation of the hardware resource to simulate the hardware resource as experiencing an error. The current state of the virtual machine can then be transmitted to the destination host computer, wherein the current state includes the emulation which simulates the hardware resource as experiencing an error. In at least one embodiment, generating the emulation includes defining the error as one that triggers a reset of the hardware resource after migration of the virtual machine from the source host computer to the destination host computer.

Generating the emulation may include forming an emulation handler that simulates a physical device experiencing the error, where the physical device provisions the hardware resource. The methodology may further include replacing mappings from the virtual machine to the hardware resource with mappings from the virtual machine to an emulation handler which is instantiated in generating the emulation.

A non-transitory computer readable storage medium may be employed to store a computer program that is directed to implementing the migration as described herein.

DETAILED DESCRIPTION

Figure 1:
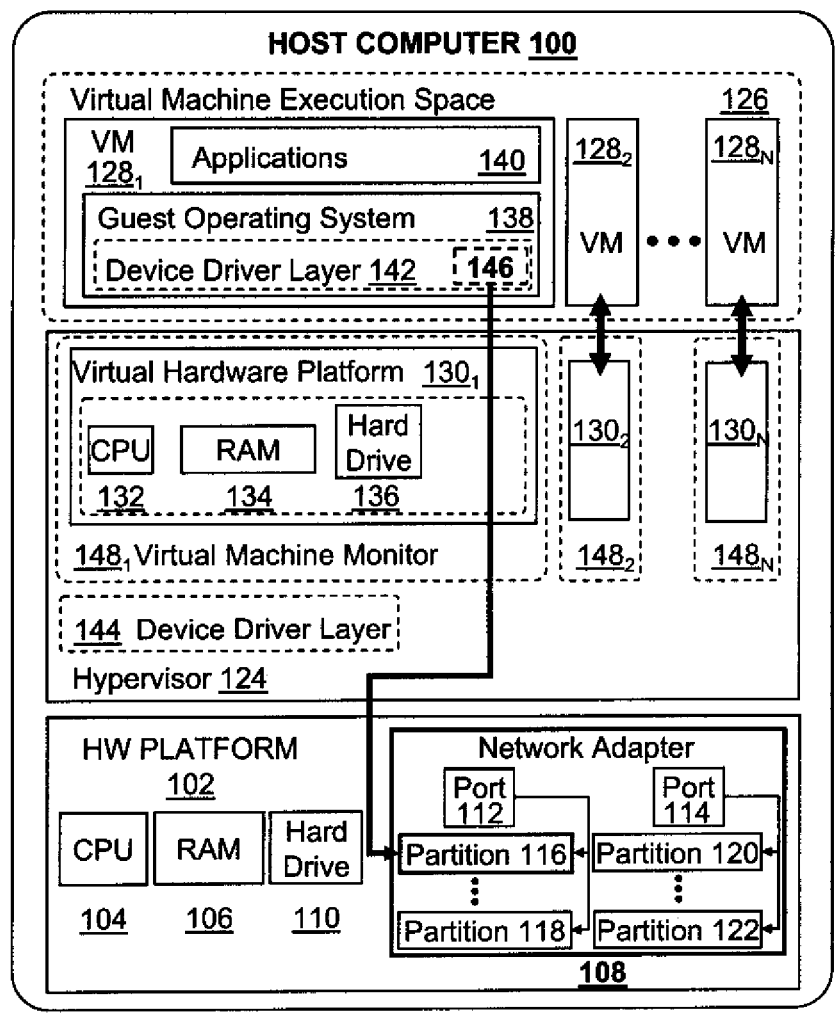
FIG. 1 depicts a block diagram of a virtualized computer system in which one or more embodiments of the invention may be practiced.

FIG. 1 depicts a block diagram of virtualized host computer 100 in which one or more embodiments of the invention may be practiced. Host computer 100 may be constructed on a desktop, laptop or server grade hardware platform 102 such as an x86 architecture platform. Such a hardware platform may include CPU 104, RAM 106, network adapter 108 (NIC 108), hard drive 110 and other I/O devices such as, for example and without limitation, a mouse and keyboard (not shown in FIG. 1). Network adapter 108 is an SR-IOV compliant device that can simultaneously support multiple VMs running on host computer 100. As shown, network adapter 108 has 2 hardware ports 112 and 114 that have associated physical resources such as queue memory and interrupts that can be divided into partitions 116 to 118 and 120 to 122, respectively, each partition supporting a VM in host computer 100. It should be recognized that any number of devices in hardware platform 102 may support virtualization directly in hardware in accordance with any known I/O virtualization specifications.

A virtualization software layer, also referred to hereinafter as hypervisor 124, is installed on top of hardware platform 102. Hypervisor 124 supports virtual machine execution space 126 within which multiple virtual machines (VMs $128_1$-$128_N$) may be concurrently instantiated and executed. For each of VMs $128_1$-$128_N$, hypervisor 124 manages a corresponding virtual hardware platform (i.e., virtual hardware platforms $130_1$-$130_N$) that includes emulated hardware such as CPU 132, RAM 134, hard drive 136 and other emulated I/O devices (not shown) in VM $128_1$. For example, virtual hardware platform $130_1$ may function as an equivalent of a standard x86 hardware architecture such that any x86 supported operating system, e.g., Microsoft Windows®, Linux®, Solaris® x86, NetWare, FreeBSD, etc., may be installed as guest operating system 138 to execute applications 140 for an instantiated virtual machine, e.g., VM $128_1$. As shown in FIG. 1, device driver layer 142 in guest operating system (OS) 138 includes device drivers that interact with emulated devices in virtual hardware platform $130_1$ as if such emulated devices were the actual physical devices of hardware platform 102. Hypervisor 124 is responsible for taking requests from device drivers in device driver layer 142 that are received by emulated devices in virtual platform $130_1$, and translating the requests into corresponding requests for real device drivers in device driver layer 144 of hypervisor 124; the device drivers in device driver layer 144 communicate with real devices in hardware platform 102.

Device driver layer 142 of guest OS 138 also includes device drivers, such as network adapter driver 146, that do not issue requests to emulated devices in virtual hardware platform $130_1$, but rather have direct, i.e., pass-through, access to hardware resources in hardware platform 102. For example, as shown in FIG. 1, hypervisor 124 has allocated partition 116 of hardware resources in pass-through network adapter 108 for VM $128_1$. Through address translation mappings set by hypervisor 124 in MMU and IOMMU components (not shown) of host computer 100, pass-through network adapter 108 is able to receive instructions from network adapter driver 146 that reference physical addresses as understood by guest OS 138, and, via direct memory access (DMA), read and write data directly from and into the system machine memory of host computer 100 that corresponds to such referenced addresses.

Those with ordinary skill in the art will recognize that the various terms, layers and categorizations used to describe the virtualization components in FIG. 1 may be referred to differently without departing from their functionality or the spirit or scope of the invention. For example, virtual hardware platforms $128_1$-$128_N$ may be considered to be part of virtual machine monitors (VMM) $148_1$-$148_N$ which implement the virtual system support needed to coordinate operations between hypervisor 124 and corresponding VMs $128_1$-$128_N$. Alternatively, virtual hardware platforms $128_1$-$128_N$ may also be considered to be separate from VMMs $148_1$-$148_N$, and VMMs $148_A$-$148_N$ may be considered to be separate from hypervisor 124. One example of hypervisor 124 that may be used in an embodiment of the invention is included as a component of VMware's ESX™ product, which is commercially available from VMware, Inc. of Palo Alto, Calif. It should further be recognized that embodiments of the invention may be practiced in other virtualized computer systems, such as hosted virtual machine systems, where the hypervisor is implemented on top of an operating system.

Figure 2:
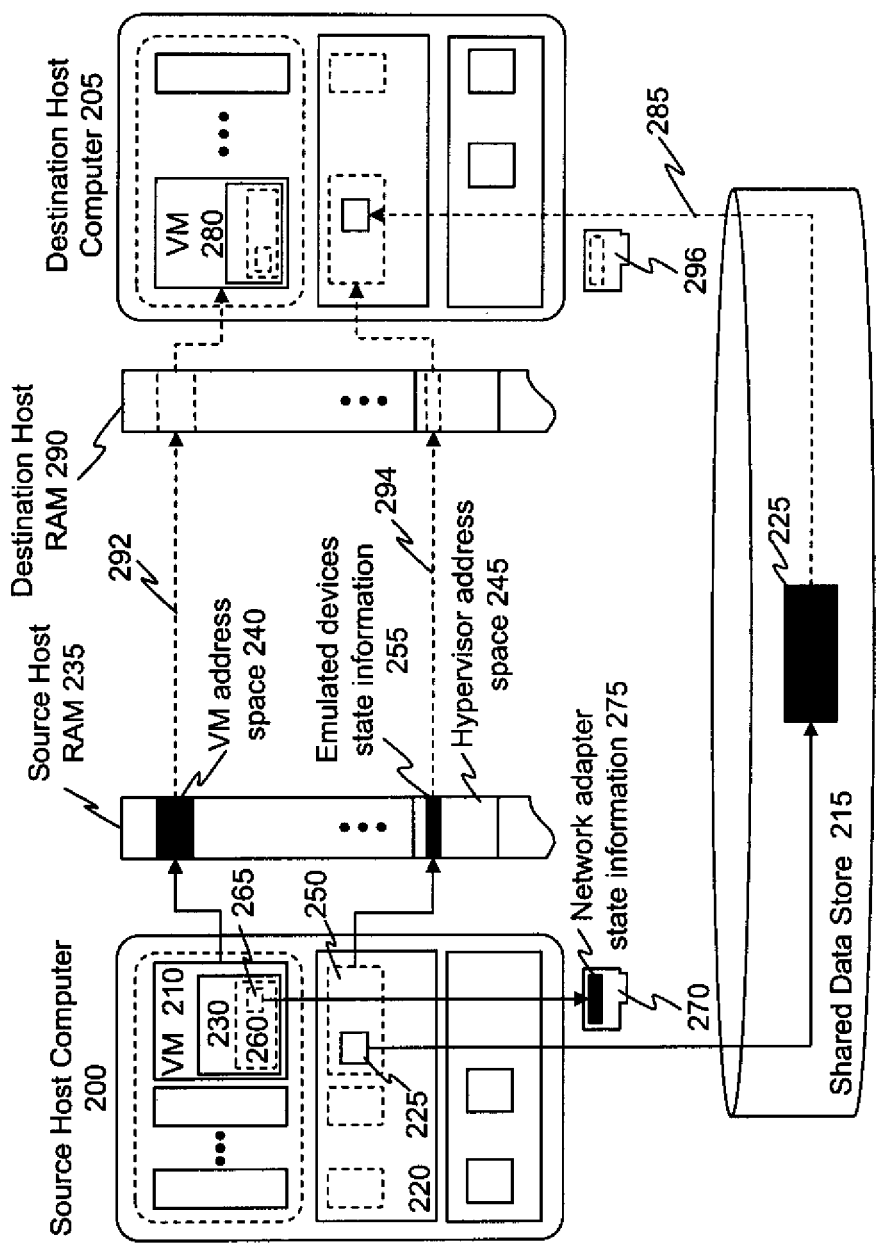
FIG. 2 depicts a conceptual diagram of a migration process in which an embodiment of the invention may be utilized.

FIG. 2 depicts a conceptual diagram of a migration process in which an embodiment of the present invention may be utilized. The migration process begins when a virtual machine cluster management server (not shown) determines that VM 210 in source host computer 200 should be migrated to destination host computer 205, for example, for load balancing purposes. Source host computer 200 and destination host computer 205 are both networked to shared data store 215. Hypervisor 220 of source host computer 200 utilizes shared data store 215 to store the contents of virtual hard disk 225 that is exposed to guest OS 230 of VM 210. Memory address space 240 allocated and used by VM 210 is stored in a section of the RAM 235 of source host computer 200. Similarly, hypervisor 220 is also allocated, and utilizes, memory address space 245 in RAM 235 that stores state information 255 of emulated devices of virtual hardware platform 250. Device driver layer 260 of guest OS 230 contains network adapter driver 265 that has pass-through access to a pass-through device, i.e., SR-IOV compliant network adapter 270. Network adapter driver 265 can directly instruct (e.g., via address mappings in the MMU, not shown, in source host computer 200) network adapter 270 to internally store state information 275 (e.g., configuration information, etc.) within its own memory resources.

The migration of VM 210 from source host computer 200 to destination host computer 205 results in VM 280 at destination host computer 205. Virtual hard disk 225 can be accessed (as indicated by arrow 285) by VM 280 because destination host computer 205 is also networked to shared data store 215. Similarly, content in VM address space 240 and state information 255 for emulated devices of VM 210 are also extracted from RAM 235 and transferred into locations in RAM 290 of destination host computer 205 that have been allocated for storage of such information in relation to VM 180 (see arrows 292 and 294). However, network adapter state information 275 cannot be readily transferred to corresponding SR-IOV network adapter 296 because network adapters do not offer the capability to extract, save or restore such information.

Figure 3:
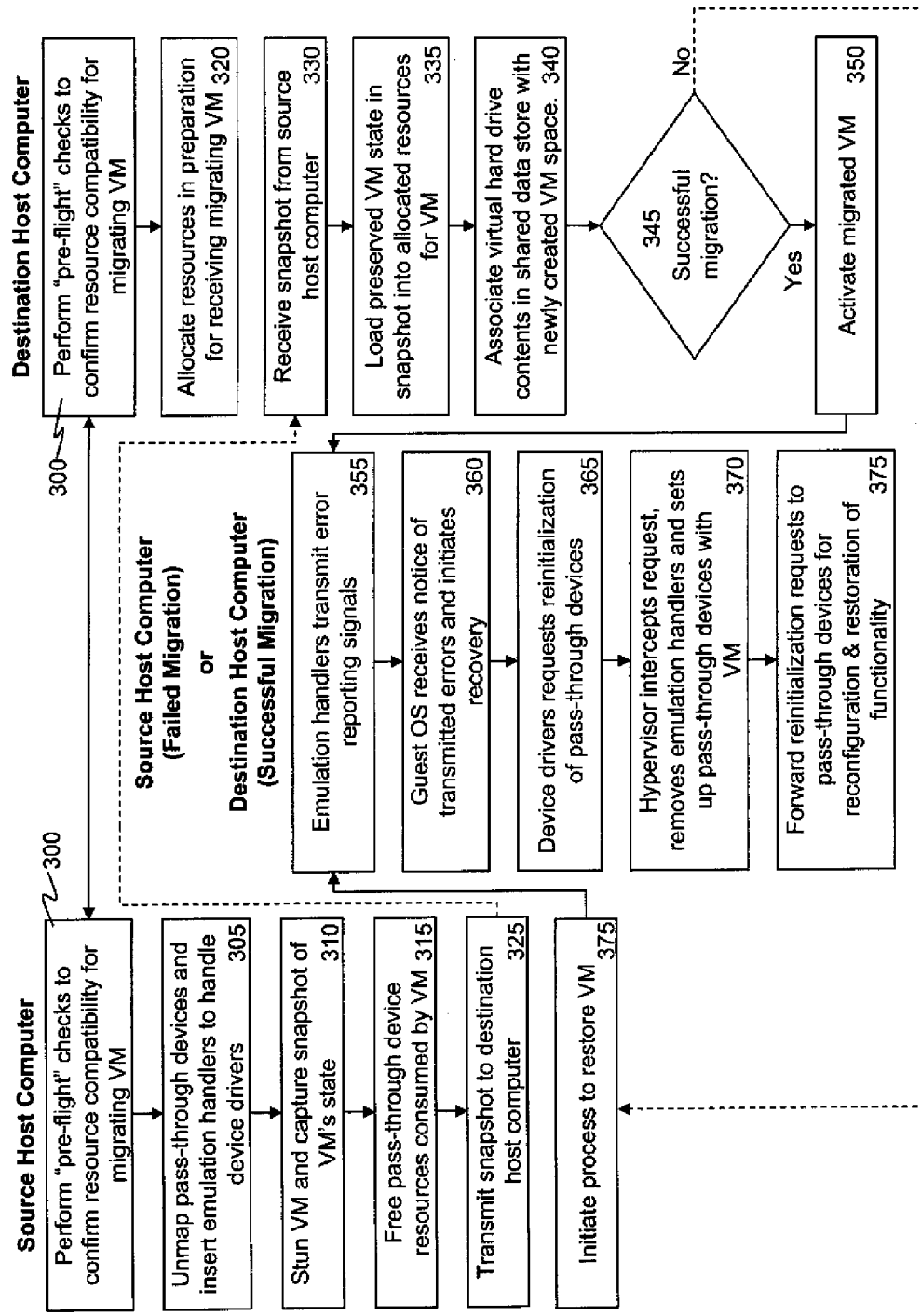
FIG. 3 is a flow chart depicting an interaction between a source host computer and a destination host computer during a migration process for a virtual machine according to one embodiment of the invention.

FIG. 3 is a flow chart depicting an interaction between a source host computer and a destination host computer during a migration process for a VM according to one embodiment of the invention. In step 300, the source host computer and the destination host computer exchange hardware, resource and configuration information to confirm that the source host computer's VM can be properly supported by the destination host computer's resources (also known as "pre-flight" checks). In particular, the source host computer confirms that the same pass-through devices utilized by the VM on the source host computer are also available at the destination host computer. In an alternative embodiment, rather than requiring the same pass-through devices to be available at the destination host computer, it is sufficient if the same device software-visible hardware interfaces (e.g., PCI interface having the same I/O memory register layout, PCI configurations registers, interrupt delivery mechanism, etc.) are available at the destination host computer.

After the pre-flight checks, in step 305, the source host computer (via its virtualization software, for example, hypervisor) unmaps its pass-through devices and inserts an emulation handler for each pass-through device to interact with corresponding device drivers in the guest OS of the VM. In one embodiment, this unmapping is accomplished by reprogramming the MMU to replace mappings relating to the pass-through device with mappings to the emulation handler. The emulation handlers intercept requests by the device drivers to their respective, now unmapped, pass-through devices, and simulate responses that the pass-through devices would transmit in the event of a hardware failure. For example, write requests from a device driver are dropped while read requests from the device driver result in responses having all bits set (i.e., all 1s). The states of these emulation handlers can then be migrated to the destination host computer.

In step 310, the source host computer freezes or "stuns" operations of the VM, and captures a snapshot of its current state, including the VM's address space (e.g., address space 240 of FIG. 2) and its emulated devices (e.g., state information 255 of FIG. 2). The state of the emulated devices also includes the state of any emulation handlers that are simulating "failed" pass-through devices. In step 315, the source host computer executes clean-up or quiescing operations to clear up and free mapping tables, physical resources and other resources in the source host computer and pass-through devices that were being utilized by the VM.

In step 320, the destination host computer allocates resources (e.g., VM address space, virtual hardware platform, virtual machine monitor, etc.) in preparation for receiving the VM from the source host computer. In step 325, the source host computer transmits the snapshot taken in step 310 to the destination host computer. In step 330, the destination host computer receives the snapshot, and in step 335, begins loading the state of the emulated devices into the newly allocated virtual hardware platform and the state of the VM's address space into the newly allocated VM address space. Of note, the emulation handlers simulating non-responsive pass-through devices are loaded as part of this step. In step 340, the destination host computer associates the VM's virtual hard drive contents that are stored in a data store shared with the source host computer with an emulated hard drive loaded into the newly allocated virtual hardware platform. If steps 335 and 340 are successful, as indicated by step 345, then in step 350, the destination host computer activates the now migrated VM and the migration may be considered successful. At this point, however, the restored emulation handlers for the migrated VM continue to simulate "failed" pass-through devices in response to requests from corresponding device drivers in the guest OS.

In step 355, the emulation handlers transmit an error reporting signal to the guest OS. For example, in one embodiment, the error reporting signal is a "fatal uncorrectable error" as defined in accordance with an Advanced Error Reporting (AER) standard specification for PCI devices. In accordance with the AER standard specification, an AER capable PCI device that recognizes an internal unrecoverable hardware failure can signal the failure to a host computer by transmitting a "fatal uncorrectable error" signal onto a PCI bus that links peripheral devices to the host computer. In accordance with PCI specifications, the operating system of the host computer receives notification of the fatal uncorrectable error from the PCI bus, and initiates an error recovery process that includes resetting the PCI bus slot of the PCI device (e.g., thereby clearing any current state of the PCI device) and requesting the AER compliant corresponding device driver to reinitialize the PCI device. During this reinitialization, the device driver restores the PCI device's state (e.g., programs configuration settings back into the device, etc.), and restores its functionality (e.g., using vendor-specific procedures that are provided in error recovery callback functions). Returning to FIG. 3, upon receiving notification of an error reporting signal from step 360, the guest OS of the migrated VM initiates an error recovery process including resetting the device and requesting the corresponding device driver to reinitialize the purported failed device. In step 365, the device driver receives the request from the guest OS and transmits a reinitialization request to the purported failed device. In step 370, the hypervisor intercepts each of these requests, locates the correct pass-through devices corresponding to the requesting device drivers, allocates a partition of resources (i.e., via SR-IOV partitions) in the pass-through devices for the migrated VM, exposes the pass-through devices to the device drivers (e.g., enable the device drivers to submit instructions directly to the pass-through devices) by setting up the MMU mappings of the devices to the migrated VM (thereby also removing the emulation handlers by replacing their MMU mappings), and exposes the migrated VM's address space to the pass-through devices by setting up the IOMMU. In step 375, the hypervisor forwards the reinitialization requests to the appropriate pass-through devices, and the device drivers and the pass-through devices communicate to reconfigure the devices and restore functionality. If, however, migration fails in step 345, then the source host computer begins the process of remapping its pass-through devices back to the corresponding device drivers in step 380 and performs the same steps 355 to 375 accomplish such mappings.

Figure 4:
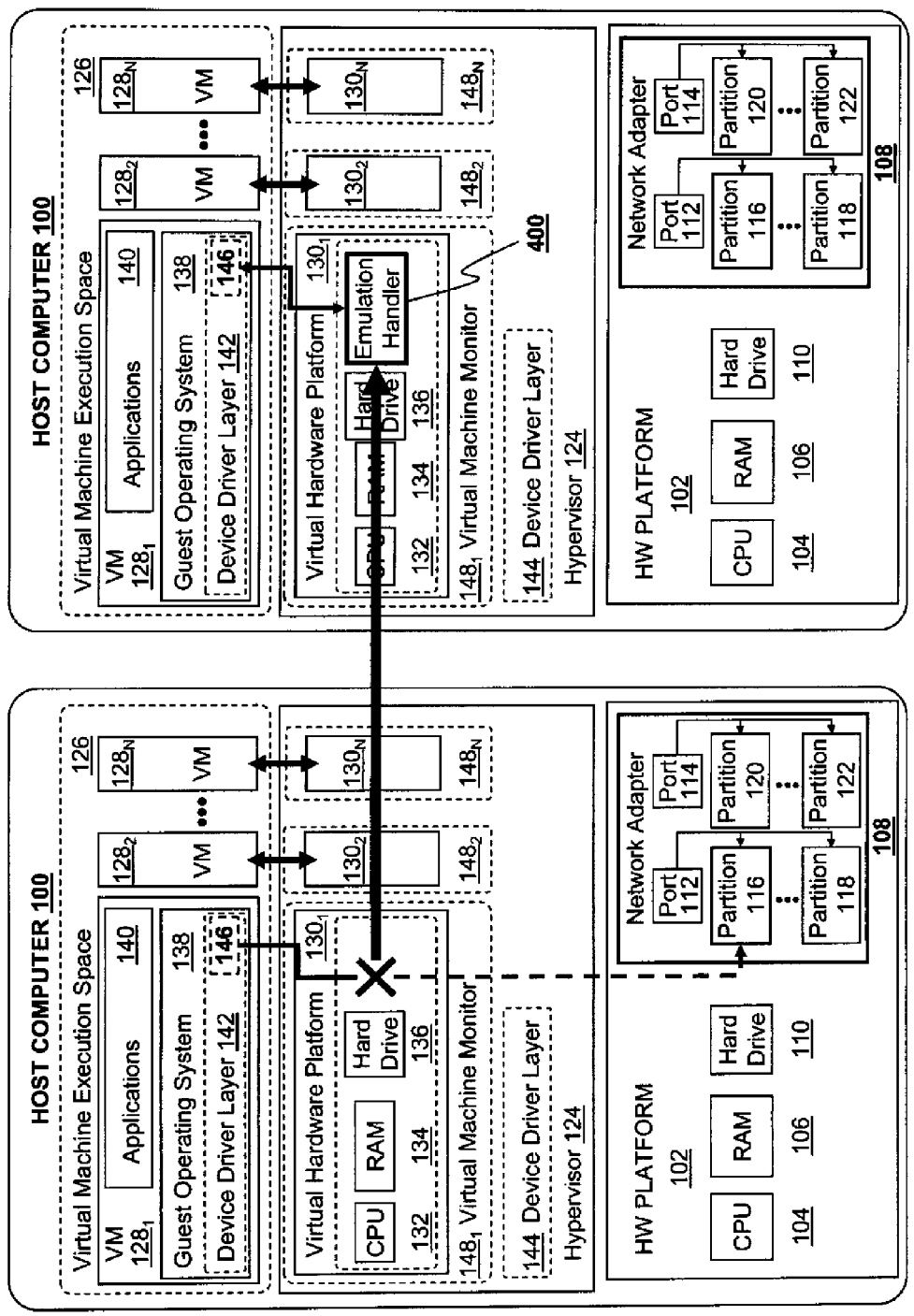
FIG. 4 depicts a visual representation of unmapping a pass-through device and inserting an emulation handler according to one embodiment of the invention.

FIG. 4 depicts a visual representation of unmapping a pass-through device and inserting an emulation handler 400 in step 305 with respect to host computer 100 of FIG. 1. Removing the emulation handler and mapping a pass-through device at a destination host computer after migration in step 370 is similar to FIG. 4, but in reverse.

In certain situations, the snapshotting process of step 310 and transmitting the snapshot in step 325 can take a considerable length of time due to the amount of data in a VM's state that needs to be copied. Certain migration techniques therefore provide an ability to copy and transfer portions of a current state of a VM to a destination host computer while the VM continues its operations on the source host computer (i.e., prior to stunning) so as not to degrade service due to migration operations (known as "pre-copying"). In certain embodiments, pass-through devices are unmapped and replaced with non-responsive emulation handlers (as in step 305) prior to pre-copying to prevent pass-through devices from changing portions of VM memory via direct memory access (DMA) that have already been transferred to the destination. In such embodiments, however, the VM's guest OS may suffer significant service interruption due to non-responsive emulation handlers during the pre-copying phase. In alternative embodiments, pass-through devices are unmapped and replaced after the pre-copying phase, thereby allowing the pass-through devices to service the VM during the pre-copying phase. In such embodiments, "clean-up" mechanisms are needed to change any VM memory that was changed by pass-through devices after such memory had already been transferred to the destination host computer during pre-copying. One possible embodiment may incorporate hardware mechanisms to inform the hypervisor at the source host computer as to what memory has changed (i.e., dirty memory pages) while another possible embodiment may provide the capability of the guest OS to report its DMA scatter-gather list setups through a specialized para-virtualization interface.

Persons skilled in the art will understand that various modifications and changes may be made to the specific embodiments described herein without departing from the broader spirit and scope of the invention as set forth in the appended claims. The foregoing description and drawings are, accordingly, to be regarded in an illustrative rather than a restrictive sense. For example, while the foregoing descriptions have discussed the SR-IOV and AER specifications, it should be recognized that any alternative specifications and technologies relating to I/O virtualization and advanced error reporting may be used consistent with the teachings herein. Furthermore, while the foregoing embodiments have described pass-through devices as SR-IOV compliant devices that can partition their physical resources among multiple virtual machines, it should be recognized that pass-through devices in alternative embodiments may be an entire physical device whose resources are have been allocated to a particular migrating virtual machine. Additionally, while certain of the described embodiments detail generating an AER signal for each pass-through device, those with ordinary skill in the art will recognize that alternative embodiments may generate only one AER signal for multiple pass-through devices. While foregoing description also describes the source host computer and destination host computer sharing a data store in which contents of virtual hard drives are stored, it should be recognized that migration can occur in alternative embodiments in which source and destination host computers do not share data stores by copying the virtual hard drives across data stores. Furthermore, rather than transferring snapshots that include the state of emulation handlers from the source host computer to the destination host computer, as described in certain embodiments herein, alternative embodiments may simply regenerate the emulation handlers at the destination host computer upon migration.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s).

I claim:

1. A method for migrating a virtual machine from a source host computer to a destination host computer, the method comprising:
identifying a hardware resource which is accessed directly by a device driver of the virtual machine, the device driver corresponding to the hardware resource;
generating an emulation of the hardware resource, including generating the emulation to simulate the hardware resource as experiencing an error; and
transmitting a current state of the virtual machine to the destination host computer, wherein the current state includes the emulation to simulate the hardware resource as experiencing an error.

2. The method of claim 1 wherein generating the emulation includes defining the error as one that triggers a reset of the hardware resource after migration of the virtual machine from the source host computer to the destination host computer.

3. The method of claim 1 wherein identifying the hardware resource is an identification of a physical device.

4. The method of claim 3 wherein generating the emulation includes forming an emulation handler that simulates the physical device as experiencing the error.

5. The method of claim 1 further comprising replacing mappings from the virtual machine to the hardware resource with mappings from the virtual machine to an emulation handler which is instantiated in generating the emulation.

6. The method of claim 1 wherein generating the emulation includes simulating the hardware resource to experience the error as a fatal error.

7. The method of claim 6 wherein the fatal error is defined in accordance with an Advanced Error Reporting standard.

8. A non-transitory computer readable storage medium having stored therein a computer program used to migrate a virtual machine from a source host computer to a destination host computer, wherein the source host computer executing the computer program implements:
identifying a hardware resource which is accessed directly by a device driver of the virtual machine, the device driver corresponding to the hardware resource;
generating an emulation of the hardware resource, including generating the emulation to simulate the hardware resource as experiencing an error; and
transmitting a current state of the virtual machine to the destination host computer, wherein the current state includes the emulation to simulate the hardware resource as experiencing an error.

9. The non-transitory computer readable storage medium of claim 8 wherein the computer program further implements generating the emulation to include defining the error as one that triggers a reset of the hardware resource after migration of the virtual machine from the source host computer to the destination host computer.

10. The non-transitory computer readable storage medium of claim 8 wherein identifying the hardware resource is an identification of a physical device.

11. The non-transitory computer readable storage medium of claim 10 wherein generating the emulation includes forming an emulation handler that simulates the physical device as experiencing the error.

12. The non-transitory computer readable storage medium of claim 8 wherein executing the computer program further comprises replacing mappings from the virtual machine to the hardware resource with mappings from the virtual machine to an emulation handler which is instantiated in generating the emulation.

13. The non-transitory computer readable storage medium of claim 8 wherein generating the emulation includes simulating the hardware resource to experience the error as a fatal error.

14. The non-transitory computer readable storage medium of claim 13 wherein the fatal error is defined in accordance with an Advanced Error Reporting standard.

* * * * *